United States Patent [19]

Larsen

[11] Patent Number: 4,950,348

[45] Date of Patent: Aug. 21, 1990

[54] METHOD FOR JOINING STRUCTURAL ELEMENTS BY HEATING OF A BINDER

[75] Inventor: Johan I. Larsen, Skien, Norway

[73] Assignee: Elva Induksjon A/S, Norway

[21] Appl. No.: 262,940

[22] Filed: Oct. 13, 1988

[51] Int. Cl.$^5$ .............................................. B32B 31/20
[52] U.S. Cl. ............................... 156/275.3; 156/274.8; 156/380.2; 156/380.9; 219/10.43; 219/10.53; 313/113
[58] Field of Search ............... 156/274.8, 275.3, 380.2, 156/291, 380.8, 380.9; 219/9.5, 10.43, 10.53, 10.57, 116; 313/113

[56] References Cited

U.S. PATENT DOCUMENTS

| | | | |
|---|---|---|---|
| 4,293,363 | 10/1981 | Wakabayashi et al. | 219/9.5 X |
| 4,446,397 | 5/1984 | Johnson et al. | 313/113 X |
| 4,577,085 | 3/1986 | Burgher et al. | 219/116 |
| 4,602,139 | 7/1986 | Hutton et al. | 219/10.43 |

OTHER PUBLICATIONS

Induction Bonding, Robotron Corporation.
Induction Heating, Robotron Corporation.
Wel-Bond Induction Adhesive Bonding Systems & Development, Welduction Group.
Assembly Engineering, Hitchcock Publication, Mar. 1989.
Heating Without Flames by ELVA Induksjon A/S, publ. May 1988.
Olofström Induction Heating Station of In Line Heating of Adhesive Bonded Hems on Automotive Panel Assemblies, Volvo, 1987.

Primary Examiner—Robert A. Dawson
Assistant Examiner—James J. Engel, Jr.
Attorney, Agent, or Firm—Remy J. VanOphem

[57] ABSTRACT

A method for joining structural elements by heating of a binder, e.g., to form panel assemblies for automobiles, including applying to a first structural element a binder at locations thereof intended to form bonding contact with corresponding locations on a second structural element, mating the second structural element with the first structural element, and hemming an outer edge of the first structural element about a corresponding edge of the second structural element to make the binder contact upper and lower faces of corresponding edges. The combination of the first and second structural elements is brought into contact with a plurality of heating elements at selected, spaced apart spots along an outer edge of the combination. Heat energy is applied at the spots to form a spot bonding between the first and second structural elements thereat by curing the binder at the spots. The remainder of the binder is left uncured, and the spot-bonded combination is then removed from the heating elements and subjected to subsequent treatment, including treatment in the atmosphere at such elevated temperatures that the spot bonds are post-cured and the remaining binder is fully cured.

9 Claims, 4 Drawing Sheets

METHOD FOR JOINING STRUCTURAL ELEMENTS BY HEATING OF A BINDER

BACKGROUND OF THE INVENTION

1. Field of the Invention

The present invention relates to a method for joining structural elements by heating of a binder, e.g., to form panels for automobiles, by applying to a first structural element a binder at location thereof intended to form bonding contact with corresponding locations on a second structural element, mating the second structural element with the first structural element, and hemming an outer edge of the first structural element about a corresponding edge of the second structural element to make the binder contact the faces of the corresponding edges.

2. Description of the Prior Art

In recent years it has become more and more usual to interconnect structural elements by means of adhesive bonding instead of using conventional methods, such as spot welding. In industrial processes the curing of the adhesive must be as rapid as possible. Heat is then used to accelerate the curing. The elements to be glued together are conventionally placed in an oven having a temperature in the range of 100°-200° C., dependent on the temperature required for suitable curing. For structural materials which are electrically conductive, it is advantageous to heat the material about joints having adhesive, by way of induction, to thereby obtain quick heating. By designing the induction coils and using a suitable frequency, the heating is limited and the energy consumption is thereby also limited to areas where the joining is to take place.

The car industry had, to a large extend, made use of processes including binders such as epoxy resins and other adhesives. Such binders are, e.g., used for door panels, hoods and hatches. These parts consist of an outer panel or structural element and an inner structural element (skeleton). The outer edges of the outer panel are hemmed over the outer edges of the inner structural element, whereafter the hem, according to the prior art, is spotwelded to interconnect the two structural elements. If the structural elements have any surface treatment prior to spot welding, e.g., such as that which provides a galvanized surface, the surface treatment at the spot weld will be deteriorated and be a potential rust-creation spot.

In recent years, the hem has been filled with an adhesive, and curing of such adhesive takes place when the car panel passes through paint curing ovens. Spot welding is thereby avoided while adhesive binding simultaneously provides better protection against corrosion by preventing moisture from entering into the hem.

In order that car panels to be joined by adhesive are to be stable in form and have sufficient strength to sustain the handling which the panels are subjected to in manufacturing, "in line" curing stations have been used. In these stations, the hems of the panels are heated along their entire length by means of induction heating to 150°-°200 C. within a period of 4-20 seconds. By this approach, it is intended to obtain a partial curing of the binder, sufficient to give the panels form stability and sufficient strength for handling and installation into the car before the final curing takes place in the process of applying paint to the car and curing the paint in appropriate ovens. In addition, the adhesive is not rubbed off upon touching.

Such induction heating is presently used with an excellent result. However, in order to avoid deformations caused by thermal expansion of the locally-heated periphery of the panels, the panels are clamped firmly against a panel shape defining bed while heating and partial temperature equalization takes place. This prior art technique is known from the brochure "Olostrom induction heating station for inline beating of adhesive bonded hems on automotive panel assemblies", and is also illustrated in the brochure "Heating without flames" by ELVA induksjon A/S, assignee of the present invention.

The induction coil is located like a loop around the periphery of the car panel assembly. Sufficiently uniform temperature distribution is obtained by adapting the location of the coil and distance to the hem of the panel assembly around the panel assembly.

Correct design of coil, correct positioning of clamping means and correct temperature cycle are required to keep deformations within acceptable limits. Curing by induction also has a tendency to amplify small deformations which are introduced in preceding stamping and hemming devices. As such, the conventional induction heating process for joining automotive panel assemblies requires several ingredients to function, such as a correct model or a structural panel assembly in order to design an construct a bed which the panel assembly can be clamped against. This is frequently required before the final tools for stamping and hemming are available.

Further, a coil which is adapted to a frequently complicated form must be made. The coil must be adjusted and readjusted by testing on the actual panel assembly such that required temperature distribution around the periphery thereof is obtained.

Finally, positioning of the clamping means must be tested in order to restrict deformations within acceptable limits.

Such factors render the conventional curing process by induction heating expensive and the work involved in redesigning the equipment to adapt to new car models is also quite expensive.

SUMMARY OF THE INVENTION

Many of the cost-inducing and complicated elements are avoided, according to the invention, when only spots or short portions of the periphery are heated and cured, sufficient to give the panel assembly adequate form-stability and handling strength. By exposing only a small portion of the periphery, suitably in the range of 10-30%, to heating, the thermal expansion of the assembly is substantially reduced. The inherent strength of the panel assembly is then sufficient to prevent permanent deformations. Thereby, the need for a tailor-made bed and clamping means is eliminated. Instead of having a continuous coil along the periphery of the panel assembly, such coil is replaced by a plurality of smaller coils having a general form, each of which is adjusted into position at a selected spot against the panel assembly. Such an approach is easy to implement when starting a production plant for the manufacturing at such panel assemblies. Further, the inventive method offers great possibilities for convenient adjustment to adapt to new car models.

By heating a lesser portion of the panel assembly, the power requirement is reduced and the panel assembly is not supplied with more energy that will cause the temperature, shortly after termination of heat application, to drop to below 50° C., such that handling by humans can be accomplished without any precautions.

The method, according to the invention, is characterized in bringing the combined first and second structural elements into contact with a plurality of heating elements at selected spaced-apart spots along an outer edge of the combination, applying heat energy at the spots to form a spot bonding between the first and second structural elements thereat by curing the binder at the spots, leaving the remaining binder uncured, removing the combination from the heating elements and subjecting it to subsequent treatment, including treatment in an atmosphere at such elevated temperatures that the spot bonds are post-cured and the remaining binder is fully cured.

According to further features of the method according to the invention, each heating element is an inductive heating coil with a power transformer. The respective primary windings of the heating element transformers are suitably connected in series.

According to an alternative embodiment, each heating element could be an infrared radiation device, e.g., a quartz lamp having an elliptical reflector to spot-focus the radiation.

Further, the heating is performed over a period of, suitably, 40 seconds.

BRIEF DESCRIPTION OF THE DRAWINGS

The invention is now to be further explained with reference to the accompanying drawings illustrating non-limitative, preferred examples of the invention.

DETAILED DESCRIPTION OF THE PREFERRED EMBODIMENT

Figure 1:
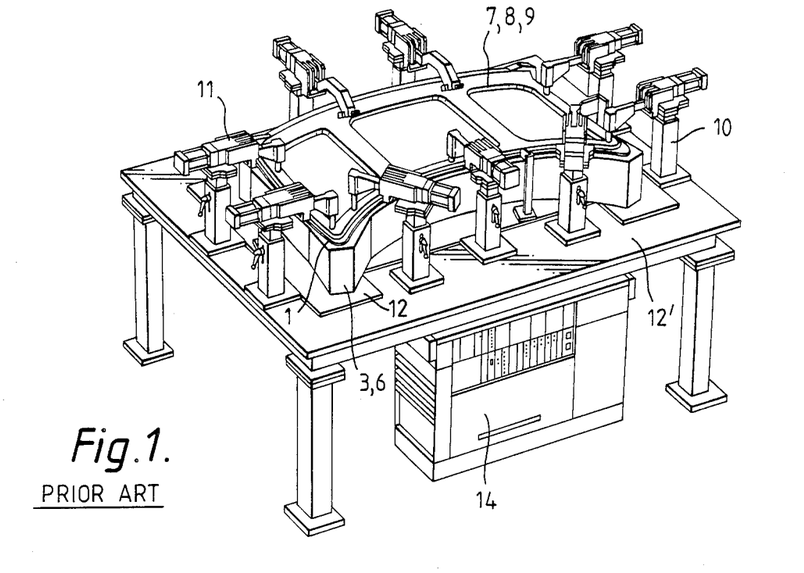
FIG. 1 illustrates prior art apparatus of an Olofstrom-ELVA induction heating station.

The prior art device illustrated in FIG. 1 is an Olofstrom-ELVA induction heating station which is designed for integration into automated panel assembly lines with a super compact under-the-table power source 14 and provides a fast, precise heating cycle. In such a conventional process, an outer panel 9 is supplied, adhesive is applied to edges of the outer panel by means of a robot, the inner panel is supplied and spot welding of elements thereto may be performed on a coordinate table, whereafter the inner panel is mated with the outer panel at a marriage point, followed by two-stage hemming of the edge of the outer panel about the edge of the inner panel. Thereafter, the panel combination is subjected to heating along the entire length of the edges thereof, whereafter the panel assemblies, now bonded together, are delivered for further processing and control. As clearly seen from FIG. 1 and 2, there is required a working table 12' having bed supports 12 for the bend 3, 6, element 3 being a fixture frame and 6 being a cover plate. A cushion 1 is provided at the top of the fixture frame 3. The reference numeral 4 indicates a segment of the induction coil and the reference numeral 5 indicates a bolted joint of the induction coil. Coolant 2 flow through the induction coil 4. The structural element combination is now placed on the bed 3, 6 as shown in FIG. 1 and is firmly clamped onto that bed clamping devices 11 which are adjustably connected to posts 10. From FIG. 1, it is seen that in the chosen example, there is required no less than eight clamping devices in order to firmly clamp the panel assembly with the hem 8 to the bed 3, 6. Such clamping devices 11 are, however, fairly expensive, in addition to the cost of the tailor-made bed 3, 6.

Figure 3:
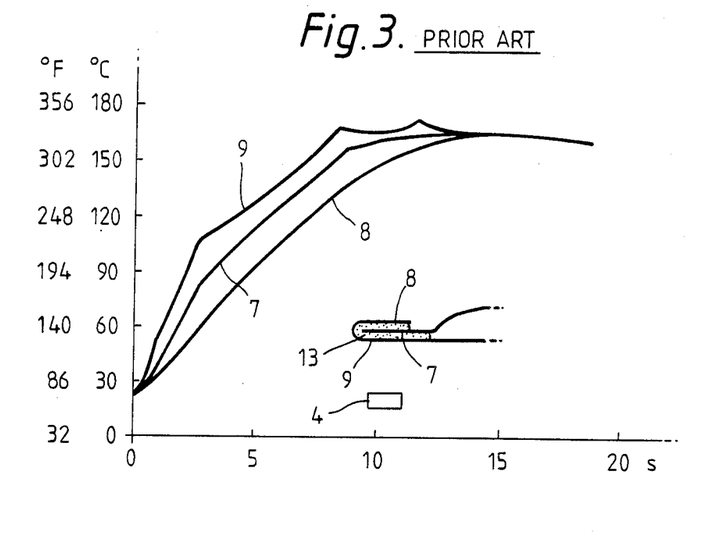
FIG. 3 is a prior art heat temperature versus heating time diagram.

After application of an adhesive, mating, and hemming, the panel assembly is placed outer panel side down and lowered onto the fixture having a plastic cushion 1 that supports it at the hemmed outer edges. Once in place, the panel assembly is secured by the clamping devices, which are suitable pneumatic clamps. The induction coil 4 under the cushion 1 is then energized to heat the hemmed flanges. Temperature and cycle time, as indicated in FIG. 3, can be programmed according to curing process specifications and the stepping speed of the production line.

At the conclusion of the heating cycle, the clamps are caused to retract, and means are provided to facilitate transfer of the panel assembly to the next station.

Figure 2:
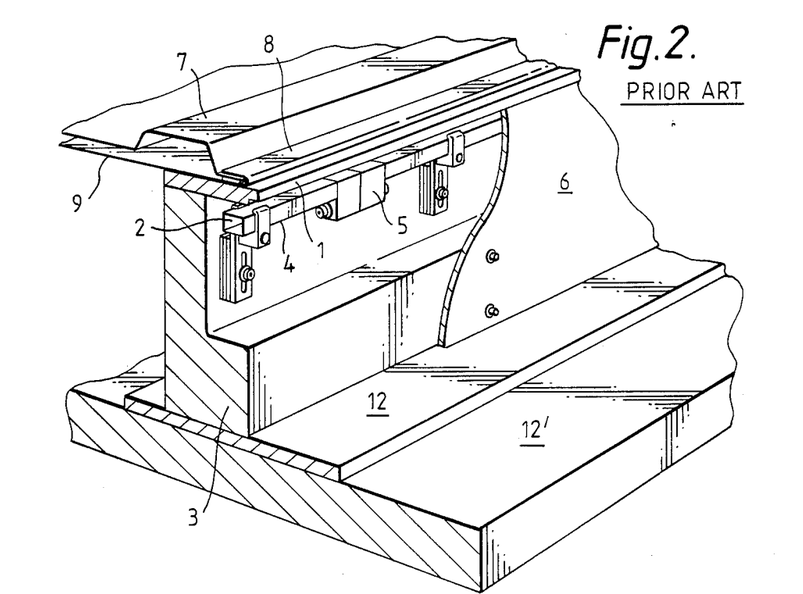
FIG. 2 also illustrates prior art apparatus of FIG. 1 in more detail with parts of the apparatus broken away for clarity.

The bed is custom made, suitably from models supplied by the user. The fixture frame 3 has individually positionable and adjustable clamps, and load sensor are available to provide input to the line control system.

The coil used in this prior art, supplied by ELVA induksjon A/S, consists of bolted section of copper tubing with a built-in coolant circuit. Such a construction has, up to the present date, simplified optimum positioning relative to the workpiece at all points. The coil according to FIG. 2 is fully enclosed.

The prior art apparatus has a compact power source housed within two boxes which are small, to fit under the fixture or working table 12'. The power source makes use of a converter technology which had done away with the need for cumbersome closed-coolant systems and jacketed cables and, incidentally, has reduced the output of audible sound frequencies. A fully modulized frequency converter is one consisting of a controlled rectifier and bridge-connected transistor inverter. A matching unit thereto includes a transformer and compensation capacitor built into a single oil-filled, water-cooled unit. Ordinary plant water can be used as a coolant, as consumption for cooling both the matching unit and the induction coil is fairly low.

An interface is provided for connection to a station or line PLC. Operation can be monitored by an energy supervision system that measures the energy which is supplied to the panel assembly. This has proved to be highly precise and have better reliability than direct temperature-measuring systems. In the prior art system, any abnormality in coil setting, heating cycle or panel location will yield a different energy consumption reading that will trigger an alarm.

Apart from the bed, including the cushion fixture frame and cover plate as well as the peripheral induction coil, all prior elements discussed above could be used in implementing the present invention.

From prior art FIG. 2, it is noted that the outer panel 9 is closest to the heating element or induction coil 4, whereas the inner panel or structural element 7 is intermediate the outer panel 9 and its hem 8. From FIG. 3, it can be seen that the temperature of the outer panel 9 at the edge thereof is higher than the temperature of the inner panel 7 which is higher than that of the hem 8, up to a temperature of approximately 170° C., unit approximately 13 seconds after the start of heating.

Although the same maximum heating temperature could be used with the present invention, the example given by the prior art in FIG. 3 is in no way to be construed as limiting to the present invention, as temperatures higher than 170° C. or lower than that temperature could be used, dependent on the temperature of curing of the adhesive in question.

However, with present types of binder, ti is preferred that the temperatures of the actual spots of the hem be brought rapidly to approximately 200° C. and kept there over a period within the cycle time such that the adhesive is supplied with a sufficient amount of energy.

Figure 4:
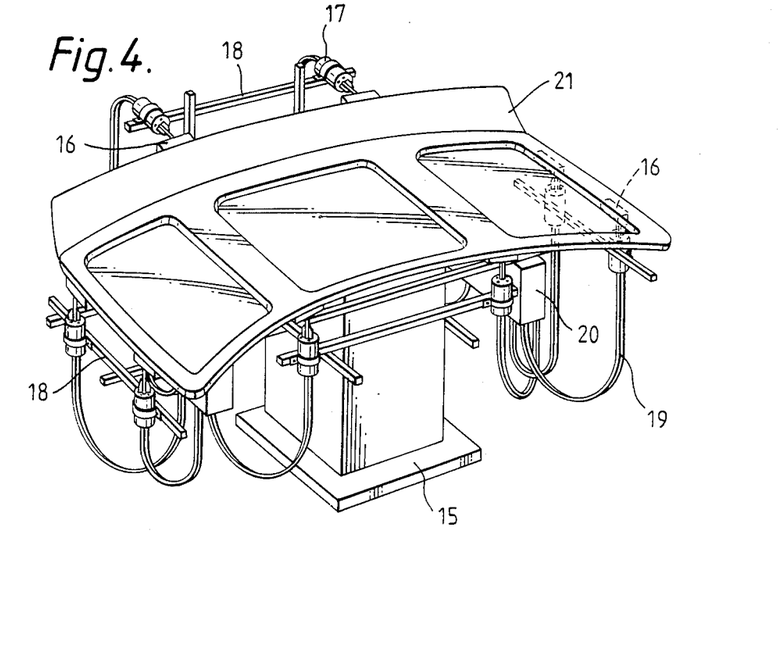
FIG. 4 illustrates the apparatus utilized in the method according to the invention for spot bonding of automotive panel assemblies.
Figures 7A, 7B:
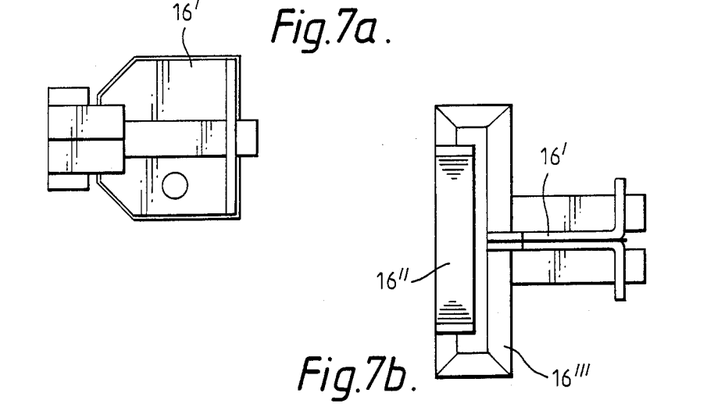
FIGS. 7a, 7b, and 7c are side, plan and front views, respectively, of a coil unit for spot bonding.
Figure 7A:
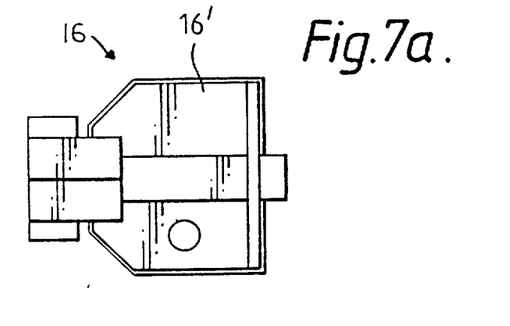
Figure 7C:
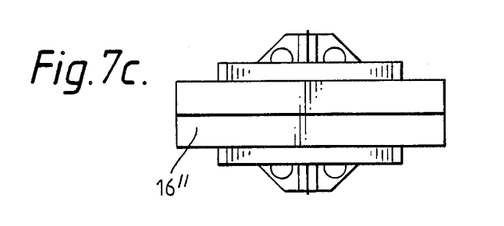
Figure 8:
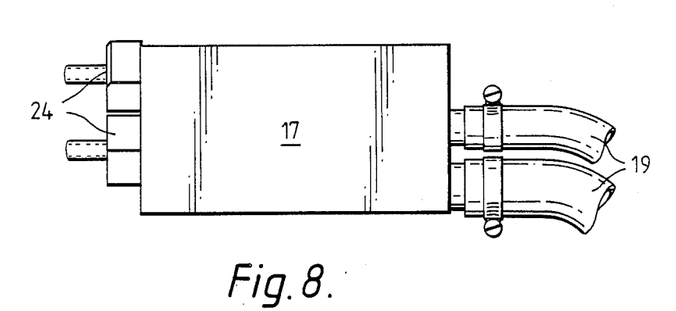
FIG. 8 illustrates a transformer unit with water-cooled power supply cables.

For simplicity, the embodiment according to the invention as shown in FIG. 4 does not include the power source 14, but it should be understood that such a power source can be located at any suitable point of the device according to that Figure. In FIG. 4, the reference numeral 15 denotes a lifting means for lifting the panel assembly or structural element combination 21 to the desired level by means of heating elements 16 which support the structural element combination at the edges thereof. Each heating element consists of an induction coil, labelled 16, as well as an output transformer 17 for each coil 16. The heating elements 16 and output transformers 17 are supported by a mechanical fixing arrangement 18 which is adjustable in at least three dimensions. Power is supplied to the transformers through flexible, water cooled cables 19. The reference numeral 20 denotes a connection box having capacitors 20'. FIGS. 7a through 7c illustrate a coil unit 16, having a coil connection member 16', a core 16", and a Cu-tube 16'''. FIG. 8 illustrates the transformer unit 17 with the cables 19. Reference numeral 24 denotes connectors for the coil unit 16.

Figure 5:
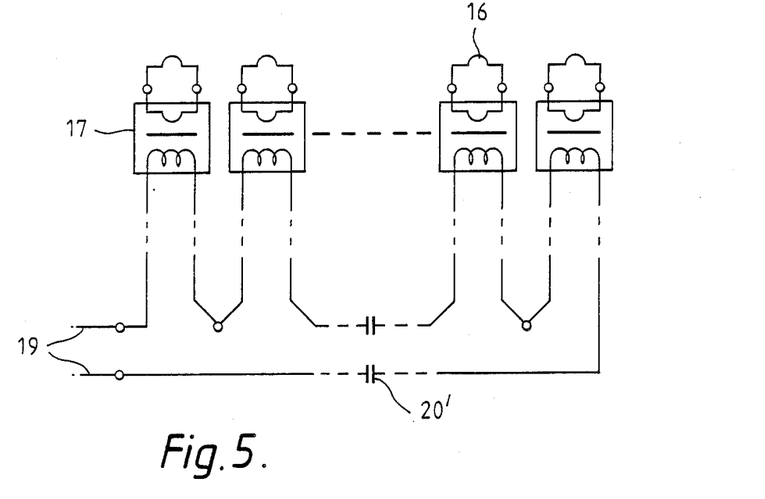
FIG. 5 illustrates a way to interconnect induction coil transformers.

When using induction heating, it is, as indicated schematically in FIG. 5, desirable to use transformers having their primary respective windings connected in series. Such transformers may be directly connected to the coils 16 and the flexible power supply by means of the cables 19, thereby rendering individual adjustment possible to provide equal energy supplied to each spot and to regulate these transformers/heating elements to provide equal energy to each spot for different panel assemblies. By a series connection, equal primary current in all transformers is secured. By using a fixed distance between the coil and the panel assembly, like amounts of energy will also be secured.

Figure 6:
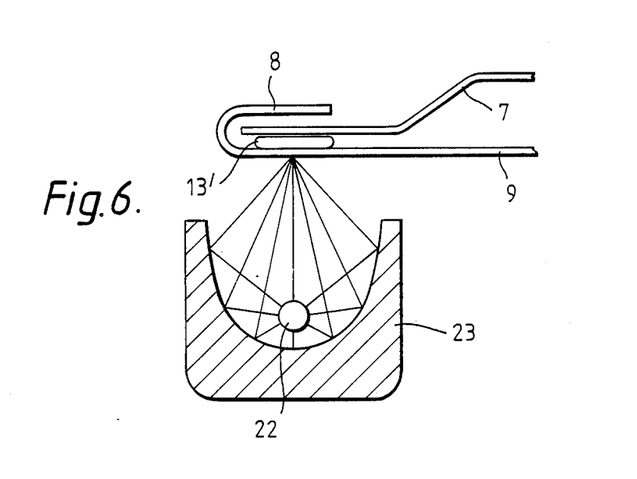
FIG. 6 illustrates a typical infrared radiation device.

As an alternative, FIG. 6 shows the use of a plurality of infrared quartz lamps 22 which may be substituted for the coil 16/transformer 17. Suitably, such lamps have an elliptical reflector 23 to cause the energy to be concentrated in small line pieces along the hem on the panel assembly. As seen from FIG. 6, binder 13' is contacting only one face of the structural element 7. However, the binder may be present, as in FIG. 3, to also contact the other face of the structural element 7. The essential point is that a spot binding is performed between at least one face of the structural element and either the hem 8 or the outer panel 9. It will be recalled that the binder material which is not spot bonded is cured in the processes at elevated temperatures that follow the spot bonding process.

In summary, the present method provides for "in line" curling of the binder in the hems on panel assemblies for, e.g., cars, such as panel assemblies of doors, boot-cover, hatch-backs, roof-hatches, by lettering only small longitudinally spaced-apart portions of the hems be heated and cured to give the object in question sufficient form-stability and strength in order to enable handing through the further production steps.

The heating, either by induction heating or IN-heating would suitably take place within a time space of 40 seconds.

When using induction heating, there are transformers connected in series, as seen in FIG. 5, with each having an induction coil arranged so that such induction coil is easy to move and adjust in order to obtain optimum heating of the pieces to be heated.

The present invention offers a simpler control system, requires lower power consumption, has no requirement for a tailor-made bed, no clamping means are necessary, a simple readjustment for adaption to a different panel assembly is available, and higher temperatures are possible, such that a greater spectrum of adhesive/binder may be available.

Having described my invention, I claim:

1. A method for joining a first structural element to a second structural element to form a panel assembly, said method comprising the steps of:

providing first and second structural elements each having first and second faces and a perimetrical edge;

applying to one of said first and second faces of said first structural element at at least one predetermined location, at least one bond of uncured, heat-curable binder;

mating said first and second structural elements so that said at least one band of uncured, heat-curable binder is juxtaposed with a corresponding predetermined location on one of said first and second faces of said second structural element;

inducing heat energy to at least one spot of said at least one band of uncured, heat-curable binder through only one of said first and second structural elements using at least one heating element, thereby curing said uncured, heat-curable binder at said at least one spot for spot bonding said first and second structural elements together, while leaving a remainder of said uncured, heat-curable binder in said at least one band substantially uncured; and thereafter subjecting said spot bonded first and second structural elements to an elevated temperature treatment wherein said cured binder at said at least one spot is post-cured and said remainder of said uncured, heat-curable binder is substantially fully cured thereby further bonding said first and second structural elements together.

2. The method of claim 1, further comprising the step of:

hemming an outer edge portion of one of said first and second structural elements along at least one portion of said perimetrical edge thereof about a corresponding portion of said perimetrical edge of a corresponding other one of said first and second structural elements after applying said at least one band of uncured, heat-curable binder.

3. The method of claim 1, wherein:

said step of inducing heat energy is conducted by using a respective inductive heating coil served by a respective power transformer as said at least one heating element.

4. The method of claim 3, wherein:

said power transformers are interconnected with one another in series.

5. The method of claim 3, wherein:

said step of inducing heat energy is conducted by using a respective infrared radiation device as said at least one heating element.

6. The method of claim 5, wherein:

each infrared radiation device is a quartz lamp provided with an elliptical reflector, and each elliptical reflector is used in said step of inducing heat energy for focusing heat energy on a respective said spot.

7. The method of claim 1 wherein:

said step of inducing heat energy is carried out for a maximum of forty seconds.

8. The method of claim 1 wherein:

said step of inducing heat energy is carried out at approximately 200° C.

9. The method as claimed in claim 1 further comprising the step of:

hemming an edge margin of one of said first and second structural elements along at least one portion of said perimetrical edge thereof about a corresponding portion of said perimetrical edge of a corresponding other one of said first and second structural elements after mating said first and second structural elements.

* * * * *

UNITED STATES PATENT AND TRADEMARK OFFICE
CERTIFICATE OF CORRECTION

PATENT NO. : 4,950,348
DATED : August 21, 1990
INVENTOR(S) : Johan I. Larsen

It is certified that error appears in the above-identified patent and that said Letters Patent is hereby corrected as shown below:

Column 1, line 11, delete "location" and insert ---- locations ----.

Column 1, line 23, after "processes" insert a comma ---- , ----.

Column 1, line 36, delete "had" and insert ---- has ----.

Column 1, line 63, delete "°200" and insert ---- 200° ----.

Column 2, line 10, delete "beating" and insert ---- heating ----.

Column 2, line 13, delete "mes"by" and insert ---- mes" by ----.

Column 2, line 29, delete "an" and insert ---- and ----.

Column 2, line 52, after "the" (second occurrence) insert ---- panel ----.

Column 2, line 62, delete "at" and insert ---- of ----.

Column 4, line 3, delete "bend" and insert ---- bed ----.

Column 4, line 8, delete "flow" and insert ---- flows ----.

Column 4, line 10, after "bed" insert ---- by ----.

Column 4, line 34, delete "sensor" and insert ---- sensors ----.

Column 5, line 8, delete "unit" and insert ---- until ----.

UNITED STATES PATENT AND TRADEMARK OFFICE
CERTIFICATE OF CORRECTION

PATENT NO. : 4,950,348

DATED : August 21, 1990

INVENTOR(S) : Johan I. Larsen

It is certified that error appears in the above-identified patent and that said Letters Patent is hereby corrected as shown below:

Column 5, line 17, delete "ti" and insert ---- it ----.

Column 6, line 5, delete "curling" and insert ---- curing ----.

Column 6, line 6, after "doors," insert ---- hoods, ----.

Column 6, line 7, delete "lettering" and insert ---- letting ----.

In the Claims

Column 6, line 36, delete "bond" and insert ---- band ----.

Column 8, line 3, after "1" insert a comma ---- , ----.

Column 8, line 6, after "1" insert a comma ---- , ----.

In the Drawings

Figure 7a, kindly add reference numeral 16 and its associated leadline as indicated on the attached sheet.

UNITED STATES PATENT AND TRADEMARK OFFICE
CERTIFICATE OF CORRECTION

PATENT NO. : 4,950,348

DATED : August 21, 1990

INVENTOR(S) : Johan I. Larsen

Page 3 of 3

It is certified that error appears in the above-identified patent and that said Letters Patent is hereby corrected as shown below:

Signed and Sealed this

Twelfth Day of May, 1992

*Attest:*

DOUGLAS B. COMER

*Attesting Officer*      *Acting Commissioner of Patents and Trademarks*